May 12, 1970 H. OHNSORGE 3,512,150

LINEAR SYSTEMATIC CODE ENCODING AND DETECTING DEVICES

Filed Nov. 10, 1965

4 Sheets-Sheet 1

INVENTOR

Horst Ohnsorge

BY Spencer & Kaye

ATTORNEYS

May 12, 1970 H. OHNSORGE 3,512,150

LINEAR SYSTEMATIC CODE ENCODING AND DETECTING DEVICES

Filed Nov. 10, 1965 4 Sheets-Sheet 2

INVENTOR
Horst Ohnsorge

BY Spencer & Kaye

ATTORNEYS

May 12, 1970 H. OHNSORGE 3,512,150

LINEAR SYSTEMATIC CODE ENCODING AND DETECTING DEVICES

Filed Nov. 10, 1965 4 Sheets-Sheet 3

INVENTOR
Horst Ohnsorge

BY Spencer & Kaye
ATTORNEYS

| $T_1$ | $f'_1$ | $N_1$ | $Q^{n+1}$ |
|---|---|---|---|
| 0 | 0 | 0 | $Q^n$ |
| 0 | 0 | 1 | 0 |
| 0 | 1 | 0 | $Q^n$ |
| 0 | 1 | 1 | 0 |
| 1 | 0 | 0 | $Q^n$ |
| 1 | 0 | 1 | - |
| 1 | 1 | 0 | $\overline{Q^n}$ |
| 1 | 1 | 1 | - |

Fig. 8a x = 2,3,4

| $T_x$ | $f'_x$ | $N_x$ | $Q^{n+1}$ |
|---|---|---|---|
| 0 | 0 | 0 | $Q^n$ |
| 0 | 0 | 1 | 0 |
| 0 | 1 | 0 | $Q^n$ |
| 0 | 1 | 1 | 0 |
| 1 | 0 | 0 | 0 |
| 1 | 0 | 1 | - |
| 1 | 1 | 0 | 1 |
| 1 | 1 | 1 | - |

Fig. 8b

INVENTOR
Horst Ohnsorge
BY Spencer & Kaye
ATTORNEYS

United States Patent Office 3,512,150
Patented May 12, 1970

3,512,150
LINEAR SYSTEMATIC CODE ENCODING AND DETECTING DEVICES
Horst Ohnsorge, Ulm (Danube), Germany, assignor to Telefunken Patentverwertungsgesellschaft m.b.H., Ulm (Danube), Germany
Filed Nov. 10, 1965, Ser. No. 507,195
Claims priority, application Germany, Nov. 10, 1964, T 27,400
Int. Cl. H03k *13/24, 13/32*
U.S. Cl. 340—347 15 Claims

ABSTRACT OF THE DISCLOSURE

Digital devices for producing and reading linear systematic test codes for successive code words, such codes being produced by sending successive groups of code word bits into a first coding device for the production of coding bits for each such group and by then sending the coding bits through successive coding devices each of which derives new coding bits therefrom. Reading is performed at a receiver by deriving an identical test code for each received code word and comparing this with the received test code.

The present invention relates to a digital device, and particularly to a coding device for carrying out a serial operation in order to derive K binary test bits from $i$ non-redundant binary bits of a code word.

In the succeeding description, the test, or check bits of a code word will be designated by Y, the non-redundant binary bits of the word itself by X, and the number of test bits derived for each code word by K.

As a result of recent developments in the computer programming art, so-called linear systematic codes have come into use for the detection of errors. These codes can generally be described by the following linear equation system:

$$[A]\cdot[X]=[Y]$$

where [A] is a code matrix or generator matrix, [X] is a one-column matrix whose bits are the non-redundant bits of a code word, and [Y] is also a one-column matrix whose bits are the test, or check, bits of a code word.

Circuits for realizing any desired binary, linear systematic code for which [A] is predetermined are known. However, these circuits are substantially more expensive than the comparable coding circuits for the so-called cyclic codes which operate to form sub-groups of the systematic codes.

It is a primary object of the present invention to overcome this drawback.

It is a more specific object of the present invention to permit the use of coding circuits which have previously been used for cyclic codes to operate with other linear systematic codes.

It is another object of the present invention to permit a single device to operate selectively as a coder or a decoder and error detector for the same code.

According to the present invention these objects are achieved by the provision of a system for effectuating a linear systematic coding in order to derive, through a linear operation, K binary test or redundancy bits from $i$ non-redundant, serial binary bits of an information word, which system is composed of at least two coding devices each arranged to receive at least one group of binary input bits and to produce, from each group of input bits, a plurality of coded output bits. The system of the present invention includes switch means connecting the coding devices together in cascade and control means operatively connected to the coding devices and to the switch means for causing the coded output bits produced from each group of input bits in each coding device to be transferred as the input to the next succeeding coding device and for resetting the coding device from which the output bits were transferred. In accordance with a particular feature of the present invention, each group of input bits supplied to the first coding device in the chain is constituted by a fraction of the total bits of the information word.

In accordance with another feature of the present invention, additional switch means are provided for converting the coding device to a decoding and error checking device in which the information bits of the coded signal are received and are subjected to an identical coding process, and in which the test bits accompanying the information word are compared with the test bits derived in the decoding device in order to determine whether any errors have occurred in the transmission of the coded information word.

Additional objects and advantages of the present invention will become apparent upon consideration of the following description when taken in conjunction with the accompanying drawings in which.

Figures 5, 6:
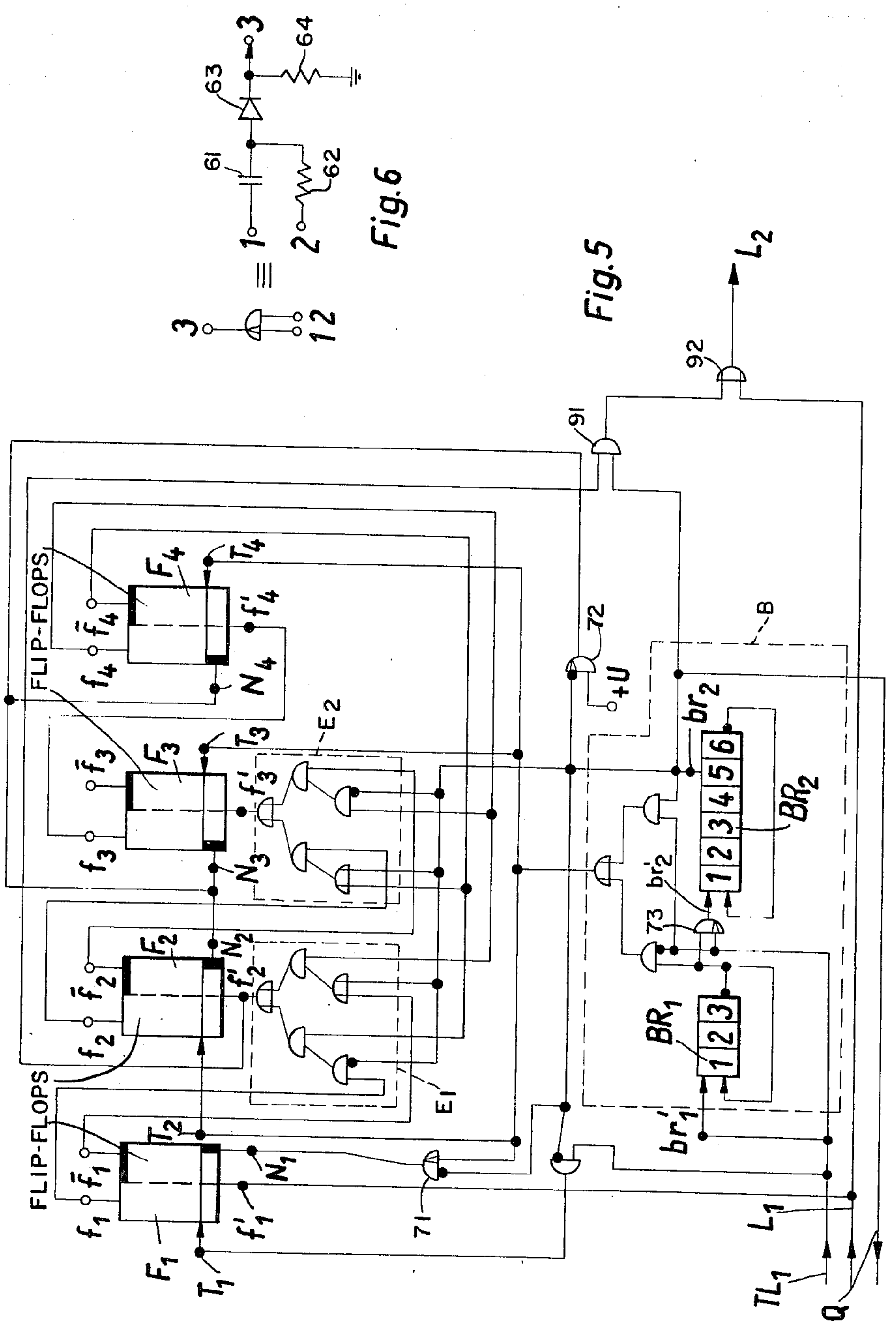
FIG. 5 is a block diagram showing the arrangement of FIG. 3 in greater detail.
FIG. 6 is a schematic diagram of an element used in the circuit of FIG. 5.

FIGS. 8*a* and 8*b* are tables showing the operation of the flip-flops of the device of FIG. 5.

Before discussing the various embodiments of the present invention in detail, it will be well to describe the operation of the devices of the present invention in mathematical terms.

The coding rule mentioned above for linear systematic codes, $[A]\cdot[X]=[Y]$, may be interpreted as meaning that a succession of non-redundant signals, or symbols, X, is to be considered as a common matrix which is to be combined with the elements of a given code matrix [A] according to the rules of the "matrix computing" technique. At this point it is not necessary to mention the sequence with which connections must be made in the devices for carrying out this operation. The equation used for obtaining the test elements, or symbols, Y, i.e., the redundancy associated with one code word, can be represented in such a manner, however, that it indicates the time sequence of these connections.

It should be noted that in this novel form of the above-defined coding rule, the matrix [A] no longer appears as such and is replaced by a series of matrices $[A_j]$ whose product is equal to the original matrix [A]. The factoring of the code matrix into these separate matrices constitutes the starting point of the novel system of the present invention for linear systematic coding.

The novel coding rule according to which the devices of the present invention operate may be represented as follows:

The index-expressions $$\frac{1}{a},\frac{1}{b}$$

etc. means 1, 2, 3 . . . *a*; 1, 2, 3 . . . *b*.

$$[A_1]\cdot[X]_{\frac{1}{a}}=[Y_1]_{\frac{1}{a}}=Y_1$$

$$[A_2]\cdot[Y_1]_{\frac{1}{b}}=[Y_2]_{\frac{1}{b}}=Y_2$$

$$[A_j]\cdot[Y_{j-1}]_{\frac{1}{k}}=[Y_j]_{\frac{1}{k}}=Y_j$$

$$[A_n]\cdot[Y_{n-1}]_{\frac{1}{z}}=[Y_n]_{\frac{1}{z}}=Y_n$$

The various terms of the above equations may be defined as follows:

$\{[A_j]\}$ is the *j*th code matrix;

{X} is the sequence of the non-redundant signals of a code word. This sequence is subdivided into *a* groups [X] so that the following relation is true:

$$[X]_{\frac{1}{a}}=\{X\}$$

and $\{Y_j\}$ is the sequence being subdivided into K groups $[Y_j]$, so that the following relation is true:

$$\{[Y_j]_{1+k}\}=\{[Y_j]\}.$$

$$\left\{[Y_j]_{\frac{1}{k}}\right\}=\{Y_j\}$$

The groups of non-redundant signals X of the code word and of the test elements Y are here shown as one-column matrices, these matrices not being indicated in the conventional manner, such as ||A||, but by means of square brackets, such as [A].

The significance of each of the equations contained in the coding rule set forth above may be understood by considering that the equation of the *j*th stage:

$$\left\{[A_j]\cdot[Y_{j-1}]_{\frac{1}{k}}\right\}=\{Y_j\}$$

indicates that by combining the matrix $[A_j]$ with all K groups of the sequence $\{Y_{j-1}\}$, the test elements $Y_j$ are produced in succession as the sequence $\{Y_j\}$.

According to the present invention, the non-redundant signals X are to be divided into *a* groups [X] with each group [X] being connected with the code matrix $[A_1]$ in order to yield a succession of the test elements Y. The processing of all *a* groups [X] yields the succession $$\left\{[Y_1]_{\frac{1}{a}}\right\}=\{Y_1\}$$

of the test elements. The sequence $\{Y_1\}$ is split up into portions $$[A_1]_{\frac{1}{b}}$$

of equal size in the order in which they are produced. These test element portions are then sent to the second coding stage where they are each combined separately in succession with the code matrix $[A_2]$. The sum of the result produced in the second coding stage is $\{Y_2\}$. The coding process is repeated through *n* stages until, in the *n*th stage, there is produced the sequence $\{Y_n\}$ of the redundancy signals to be added to the code word at the time of its transmission.

A special case of this multistage coding process exists if the non-redundant binary elements X of a code word are not divided into groups. In this case, the number of elements of the code word is identical with those of a single group [X] and the above-described coding rule becomes:

$$[A_1]\cdot[X]=[Y_1]$$
$$[A_2]\cdot[Y_1]=[Y_2]$$
$$[A_j]\cdot[Y_{j-1}]=[Y_j]$$
$$[A_n]\cdot[Y_{n-1}]=[Y_n]$$

From which it results that:

$$\overset{n}{j^{\pi}=1}[A_j]\cdot[X]=[Y]$$

where $\pi$ is a product symbol.

A comparison of the above relation with the linear equation system initially set forth above shows that the following identity exists:

$$\overset{n}{j^{\pi}=1}[A_j]=[A]$$

Referring now specifically to the drawings, several embodiments of devices according to the present invention are shown for carrying out the above-described operations. In these drawings, identical parts are given the same reference characters. All information transmitting paths are denoted by solid lines, while all paths for transmitting clock signals and control signals are shown as broken lines in FIGS. 1 to 4. It should be understood that, for purposes of simplicity, a broken line may represent a plurality of paths for transmitting several control signals and one clock signal in cases where such a plurality of signals is required for the function of a particular circuit. In addition, the following symbols are employed throughout the various figures:

*i* representing the number of the non-redundant binary elements of a code word;

K representing the number of the binary test elements derived from the non-redundant binary elements of a code word;

*u* representing the number of the bits in each group of input bits to one coding stage;

*v* representing the number of test bits derived from one group of input bits;

*n* representing the number of coding stages; and

*j* representing an arbitrary coding stage.

Figures 1, 2, 3, 4:
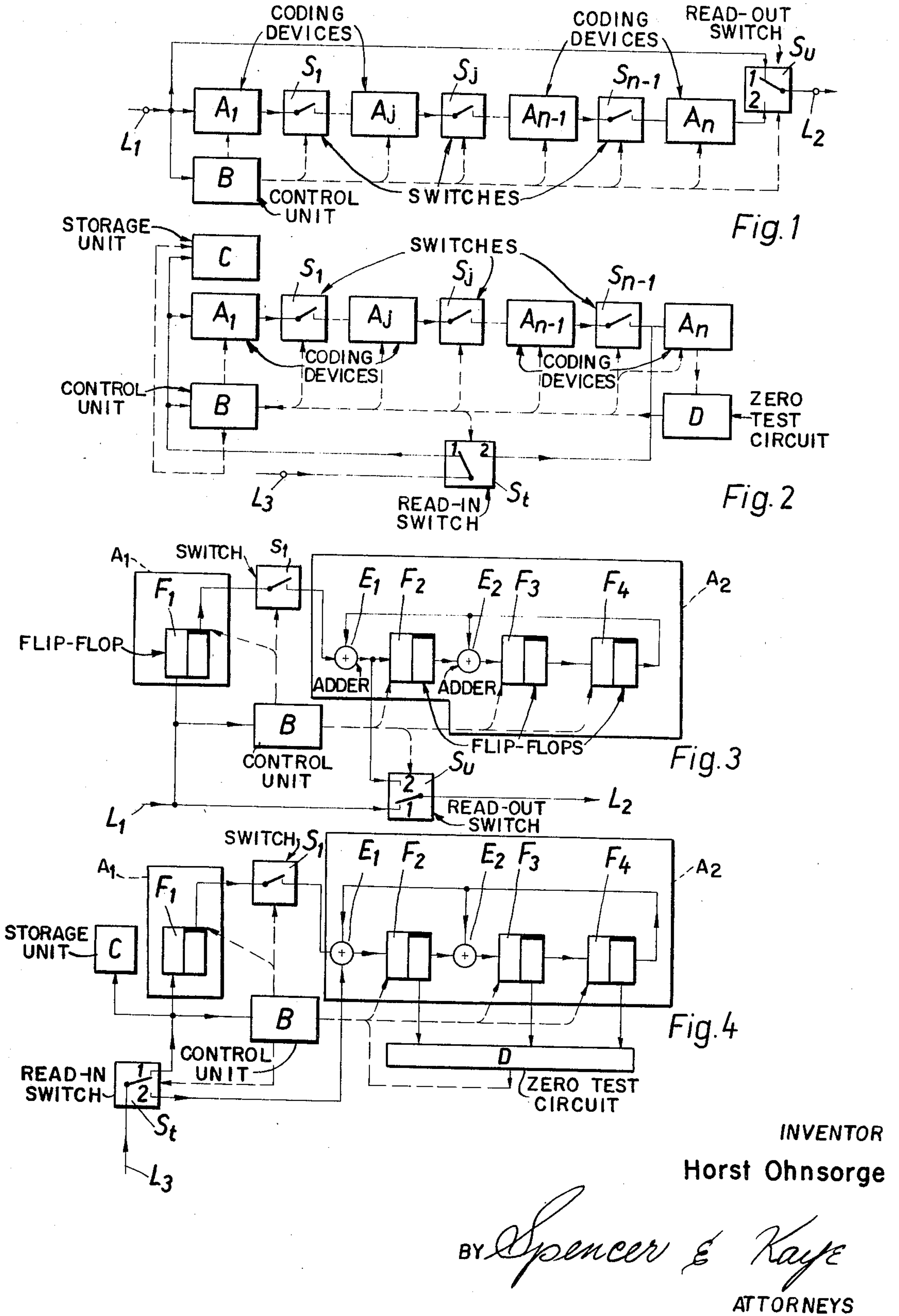
FIG. 1 is a block diagram of a basic coding system according to the present invention.
FIG. 2 shows the modification of the device of FIG. 1 for decoding linear systematic codes.
FIG. 3 shows another embodiment of the present invention having two coding stages.
FIG. 4 shows the embodiment of FIG. 3 arranged for decoding linear systematic codes.

Referring now specifically to FIG. 1, $A_1$ to $A_n$ denote coding devices which are connected in cascade in alternation with a series of switches $S_1$ to $S_{n-1}$. The operation of the coding devices and of the switches is controlled by control pulses transmitted by control unit B, which unit also controls the operation of a read-out switch $S_u$. The information bits of a particular code word are delivered to the system at the terminal $L_1$ and leave the system, together with the redundancy bits of that word, via the termnial $L_2$. The coding device $A_1$ is designed to function according to a computing rule represented by the code matrix $[A_1]$ to form test bits $Y_1$ from the information bits X which it receives via terminal $L_1$. Each of the bits received by the coding device $A_1$ is counted in the control unit B, which control unit is arranged to produce a pulse which closes switch $S_1$ after having received *u* information bits, constituting each group [X]. The unit B effects the closing of switch $S_1$ for a length of time which is equal to one clock pulse. During the period when switch $S_1$ is closed, all of the test bits produced by the coding device $A_1$, which test bits form a sequence $\{Y_1\}$ of test elements, will be transferred into the coding device $A_2$ (not shown). For the coding operation to be carried out correctly, the test bits must be transferred out of each coding device at a higher rate than that at which information bits are transferred into the device. This requirement can be circumvented, however, by the provision of an auxiliary register for receiving the parallel transfer of the derived test bits from one coding device and for subsequently producing a serial read-out of these test bits into the following coding device. This latter arrangement is not shown in FIG. 1.

The sequence $\{Y_1\}$ appearing at the output of coding device $A_1$ is constituted by $b$ groups each having $v$ test bits. These $b$ groups $[Y_1]$ are then transferred into the coding device $A_2$ in succession and after the last bit of the $b$th group has been transferred thereto, the control unit B operates to close the switch $S_2$ (not shown) for a length of time equal to one clock pulse in order to transmit the test bits $$\left\{[Y_2]_{\frac{1}{b}}\right\}$$

derived from the succession of test bits $$\left\{[Y_1]_{\frac{1}{b}}\right\}$$

Although neither the coding device $A_2$ nor the switch $S_2$ are specifically shown in FIG. 1, they may be considered to be represented by the device $A_j$ and the switch $S_j$, which represent any arbitrary stage in the device.

The same process is carried out in the coding device $A_j$ of each succeeding stage. Briefly restated, this process involves: dividing of the input signal bits into a plurality of groups or portions (e.g., $a$ groups into coding device $A_1$); separately coding each group; and transferring the test bits derived in the coding device for each group into the next following coding device. It may thus be stated in general terms that the input to the coding device $A_j$ is composed of groups each having $u_j$ input bits and that the output from this coding device is composed of groups each having $v_j$ derived test bits, the number of bits in a group associated with one coding device generally differing from the number of bits associated with other coding devices.

During the processing of a code word, the coding process continues from the coding device $A_1$ through the coding device $A_j$ until passing through the final coding device $A_n$. The operation of counting the bits, which must be carried out to control each of the coding switches $S_1$ to $S_{n-1}$, can be performed in various ways. According to one technique, it is possible to count only the information bits delivered to the coding device $A_1$ and to derive all control commands on the basis of this information. Alternately, it is possible to provide a separate counter for each coding device.

The circuit of FIG. 1 is also provided with a transmission path along which the information bits of the code word X pass directly via the position 1 of the read-out switch $S_u$ to the output terminal $L_2$. After the termination of the above-described process for a code word, $v_n$ test bits are derived at the output of the coding device $A_n$, these bits constituting the redundancy bits of the associated code word, with $v_n$ being equal to K. The read-out switch $S_u$ is then switched to position 2 and K read-out pulses are sent from the control unit B to transmit the $v_n$ bits to the terminal $L_2$.

FIG. 2 shows the arrangement of FIG. 1 modified for decoding linear codes produced by the device of FIG. 1. The device of FIG. 2 is arranged to test the code word transmitted by the device of FIG. 1 in order to determine whether it is free of errors. This operation is carried out by again deriving K test elements from the $i$ non-redundant binary elements X of the original code word and by then storing the K test elements Y of the code word transmitted by the device of FIG. 1. It is the inherent property of all linear codes that, if no errors exist, a comparison of the test elements derived in the arrangement of FIG. 2 with the test elements received by this device will always establish that the word has been transmitted without errors. It is this property which is made use of in the checking device of FIG. 2. The coding system of this device, i.e., the matrices present in the coding devices $A_1$ to $A_n$, is identical with that of the original coding device of FIG. 1. The transmitted code word reaches the decoding system by way of a terminal $L_3$. The $i$ information bits of each code word arrive when the read-in switch $S_t$ is in the position 1, as shown, and are thus transmitted to the input of the first coding device $A_1$ and to a receiving storage unit C. After all of these information bits have passed thereto and after the complete coding operation has been carried out, the last coding device $A_n$ contains the K test bits derived from the respective code word. In order to carry out the comparison, it is necessary to conduit the K test bits, which are also transmitted via terminal $L_3$ into the coding device $A_n$. This is carried out by switching the read-in switch $S_t$ into the position 2 after all of the information bits X of the code word have been conveyed to coding device $A_1$. If the test bits derived in the device of FIG. 2 coincide with those received via the terminal $L_3$, the output of the coding device $A_n$ contains only zeros at the end of the coding process. Such an output indicates that the code word has been transmitted without error. However, if the contents of the coding device $A_n$ are not equal to 0, this indicates that the information has been altered during transmission. When an error is detected, a zero test circuit D transmits a command to the control unit B which, in turn, operates to erase the code word which was last stored in the storage unit C.

Because of the almost completely identical construction of the coding system of FIG. 1 and the decoding system of FIG. 2, it is possible, in accordance with one of the principal features of the present invention, to use a single device constructed according to the present invention both as a coder and a decoder and error checker. In order to permit such a result to be obtained, it is necessary to make certain additions to the system of FIG. 2 so as to provide terminals $L_1$ and $L_2$ and a switch which will perform the function of read-out switch $S_u$. It would also be necessary to add a further switch between the control line from zero test circuit D to control unit B for breaking the connection between these two circuits when the device is to act as a coder. This arrangement makes it possible to convert the system from a coder to a decoder, and vice versa, by merely operating a few switches.

FIG. 3 shows a block diagram of a coding device similar to that of FIG. 1, but containing only two coding devices. The first coding device is constituted by a bistable flip-flop stage $F_1$, while the second coding device is constituted by three cascaded flip-flop stages $F_2$, $F_3$ and $F_4$ and two modulo 2 addition stages $E_1$ and $E_2$. The second coding device is arranged in the form of a shift register with feedback, as is conventional for coding purposes. The sides of the flip-flop stages $F_1$ to $F_4$ having a black region are in the zero state before a coding process commences. The arrows in the figures show the direction of transmission of information within the coding system.

The operation of the device of FIG. 3 will be described in connection with the coding of a word having 15 bits. From the succession $\{X\}$ of 15 bits, five groups of three bits each are derived by the flip-flop stage $F_1$ under the control of control unit 8, each group of three bits being separately processed in the second coding device to produce a single test bit Y. The flip-flop stage $F_1$ constitutes the coding device $A_1$, while the other flip-flop stages and the adders $E_1$ and $E_2$ form the coding device $A_2$.

The bistable flip-flop stage $F_1$ performs a modulo 2 addition of each group of input signals, and thus the coding device $A_1$ has the code matrix $[A_1]=[L\ L\ L]$.

In the present specification, the symbol L will be used to represent the binary "1" in order to avoid confusion with other uses of the numeral.

After the arrival of each group of three bits at the flip-flop stage $F_1$, the switch $S_1$ is closed for a period of time until the occurrence of the next read-in pulse. While the switch $S_1$ is closed, the contents of the flip-flop stage $F_1$ are transferred to the shift register constituting coding device $A_2$. Since the coding device $A_1$ produces one bit of the sequence $\{Y_1\}$ for each group of three bits, a total of five bits will be delivered to the input of coding device $A_2$ for each word of 15 bits to be coded. These five bits are combined with the code matrix $[A_2]$ of the second device. The second coding device is arranged to have the following code matrix.

$$[A_2]=\begin{bmatrix} 0 & L & 0 & 0 & L \\ L & L & 0 & L & 0 \\ L & 0 & L & 0 & 0 \end{bmatrix}$$

The following table gives a sample input into coding device $A_1$ divided into groups of three bits, this input constituting a code word $[X]$, and the corresponding outputs from the coding device $A_1$ constituting the bits of a test sequence $\{Y_1\}$.

| | | | | | |
|---|---|---|---|---|---|
| L0L | L00 | 0L0 | LL0 | 00L | $\{X\}$ |
| 0 | L | L | 0 | L | $\{Y_1\}$ |

It may thus be seen that each group of three successive bits is coded by the flip-flop stage $F_1$. In the above table, the test bit $Y_1$ derived from each of these groups has been written directly below the corresponding group. All five test bits forming the sequence $\{Y_1\}$ are delivered to the coding device $A_2$. After all five bits have been transferred into the shift register constituting this coding device, each of the bistable flip-flop stages $F_2$, $F_3$ and $F_4$ will be found to contain an L for the particular code word set forth above. Thus, the sequence $\{Y_2\}$ of $K=3$ test bits assigned to this code word is: L L L.

The result may be verified in a purely arithmetical manner by forming the product:

$$[A_1]\ [A_2]\ [X]=[Y_2]$$

Thus, it may be appreciated that the coding system of FIG. 3 has the following composite code matrix:

$$[A_1]\,[A_2]=\begin{bmatrix} 000 & LLL & 000 & 000 & LLL \\ LLL & LLL & 000 & LLL & 000 \\ LLL & 000 & LLL & 000 & 000 \end{bmatrix}$$

The arrangement of FIG. 4 is constituted essentially by the device of FIG. 3, but has been modified in the same manner as the device of FIG. 2 to give it the capability of decoding linear systematic codes. Thus, the device of FIG. 4 operates in the same manner as that of FIG. 2.

The manner in which a sequence of input bits is divided into groups is determined solely by the operation of control unit B. Thus, it is possible to arrange the devices of FIGS. 1 to 4 to operate in the manner set forth for the previously mentioned special case wherein a multistage coding operation is carried out when the sequence $[X]$ of non-redundant elements of a code word constitutes a single group.

In the prior art arrangements for linear systematic coding, it is possible to carry out error corrections in such a manner that the error pattern of the code word is determined in the register stages F after a complete code word has been received. The erroneous bits of the code word can then be corrected. Such an error correction process can also be carried out in the system according to the present invention for linear systematic coding.

Turning now to FIG. 5, there is shown a more detailed circuit diagram of the arrangement of FIG. 3. This circuit will be described in detail with the aid of FIG. 6, which shows a detailed diagram of a particular element of the circuit of FIG. 5, FIG. 7, which shows wave forms appearing at various points in the device of FIG. 5, and FIGS. 8*a* and 8*b*, which show the relative states of the flip-flops $F_1$ to $F_4$ of the device of FIG. 5.

In the arrangement of FIG. 5, each of the flip-flops $F_1$, $F_2$, $F_3$ and $F_4$ has three inputs T, $f'$ and N as well as two outputs $f$ and $\bar{f}$. The input $f'$ to each flip-flop is connected to deliver information or switching pulses, the input T is connected to deliver clock pulses, and the input N is connected to conduct an erasing signal. A voltage appearing at input $f'$ will change the state of its associated flip-flop if, and only if, it occurs in coincidence with a clock pulse at the input T associated with the same flip-flop, while a signal at the input N resets the associated flip-flop to zero regardless of the states of inputs $f'$ and T. It may thus be appreciated that, with respect to the response produced by input $f'$, the flip-flops of the device of FIG. 5 function as synchronized, pre-storage devices.

Taking the flip-flop $F_1$ as an example, the dependency of the outputs $f_1$ and $\bar{f}_1$ on the values of the input signals T, $f'_1$ and N and upon the existing flip-flop state Q is shown in FIG. 8*a*. The symbol $Q^n$ represents the *n*th state, while the symbol $Q^{n+1}$ represents the $(n+1)$th flip-flop state. T, $f'_1$ and N are the input values which are applied when flip-flop $F_1$ is in the $Q^n$ condition to bring it to the $Q^{n+1}$ condition. The table of FIG. 8*a* readily reveals that the flip-flop $F_1$ forms the modulo 2 sum of the input signals appearing at $f'_1$ which signals are identical to the information signals appearing at line $L_1$.

It was mentioned above, that the flip-flops $F_1$, $F_2$, $F_3$, $F_4$ are synchronized pre-storage devices. Pre-storage-flip-flop devices are described for instance in: A. I. Pressmann, "Design of Transistorized Circuits of Digital Computers," New York, 1959, chapter 11/5 in connection with chapter 2/5.

The table of FIG. 8*b*, shows a similar relation for the flip-flops $F_2$, $F_3$ and $F_4$, with the symbol $x$ representing the subscript of the particular flip-flop of interest.

A modulo-2-sum-flip-flop is for instance described in M. Phister, "Logical Design of Digital Computers," J. Wiley & Sons, New York, 1958, pp. 126/127. Attention must be paid to the fact that in addition to the cited literature the flip-flop $F_1$ is synchronized by T and reset independently from T by N.

Flip-flops, having the same functions as the flip-flops $F_2$, $F_3$, $F_4$ are called R-S-flip-flops and for instance described in M. Phister (mentioned above), pp. 121–126. Additional to Phister, $F_2$, $F_3$ and $F_4$ have two more inputs. That are input T for synchronism and a reset input N, which operates its flip-flop independently from T. The last column of FIG. 8 shows a bar in the 6th and 8th line. That is why the conditions of $T_x$, $f'_x$ and $N_x$ in these lines are not allowed, so that these conditions will not be taken in consideration as to set or reset the flip-flops.

A series of AND gates and OR gates representing a preferred embodiment of the modulo 2 addition stages $E_1$ and $E_2$ are shown in detail in FIG. 5. All of these gates operate in a conventional manner. Referring specifically to adder $E_1$, the output signal $f'_2$ therefrom may be represented by the following equation in which the symbols used are those of Boolean algebra and in which a symbol with a bar over it represents the complement, or the negative of the same symbol minus the bar.

$$f'_2=(f_1\times\overline{br}_2)\bar{f}_4+(br_2+\bar{f}_1)f_4$$

From this expression, it may be seen that if $br_2=0$, then $$f'_2=f_1\times\bar{f}_4+\bar{f}_1\times f_4$$

and if $br_2=1$, then $f'_2=f_4$.

Similarly, it may be determined in a straightforward manner that the value of the input $f'_3$ to flip-flop $F_3$ may be expressed as follows:

$$f'_3=(f_4\times\bar{b}r_2)\bar{f}_2+(br_2+\bar{f}_4)f_2$$

This expression reveals that when $br_2=0$:

$$f'_3=f_4\times\bar{f}_2+\bar{f}_4\times f_2$$

and when $br_2=1$, $f'_3=f_2$.

It may be seen from the above equations that when $br_2=0$ the coding device defined by flip-flops $F_2$, $F_3$ and $F_4$ operate as a coder with the modulo 2 addition stages actuated, while this arrangement operates as a shift register when $br_2=1$, resulting in the transmission of the redundancy bits from the flip-flops $F_2$, $F_3$ and $F_4$ through AND-gate 91 and OR-gate 92 to line $L_2$. In this embodiment, the gates 91 and 92 perform the function of the read-out switch $S_u$.

In the device of FIG. 5, the control unit B is constituted by a three-position ring counter $BR_1$ connected in cascade, through the intermediary of a special type of gate which will be described in detail in connection with FIG. 6, with a six-position ring counter $BR_2$. The control unit B also comprises several AND- and OR-circuits necessary for proper operation.

The arrangement of FIG. 5 differs from that of FIG. 3 in that an additional input line $TL_1$ and additional output line Q have been added. While the line $L_1$ supplies the information bits to the device, the line $TL_1$ delivers a continuous series of clock pulses which are synchronized with the information bits. Such an arrangement is designed to operate with an information source which transmits the information pulses together with the clock pulses. The line Q, which is connected to, and which has the same voltage as, the output $br_2$ from the six-position ring counter, is also connected to the source of information pulses in such a way that a positive voltage on this line Q inhibits the source from transmitting any information pulses but does not inhibit the transmission of clock pulses. A positive pulse is present on line Q during the period when the test bits are being fed from flip-flops $F_2$ to $F_4$ to line $L_2$.

The circuit of FIG. 5 is seen to contain three special gates 71, 72 and 73 whose circuitry is shown in detail in FIG. 6. As is shown in FIG. 6, each of these gates comprises a capacitor 61 connected in series with input terminal 1, a resistor 62 connected in series with input terminal 2, a diode 63 having its plate connected to a common terminal of capacitor 61 and resistor 62, and an output resistor 64 connected between ground and output terminal 3, to which the cathode of diode 63 is also connected. This device operates to produce an output pulse on terminal 3 when the following input condition is satisfied: a positive voltage is present at terminal 2 and the voltage on terminal 1 goes from zero to a positive voltage.

A special gate like this one just mentioned is described for instance in: R. K. Richards, "Digital Computer Components and Circuits," D. Van Nostrand Company, Inc., 1957.

One of the input terminals of the special gates 71 and 72 in FIG. 5 gets inverted signals, especially the left terminal of gate 71 and the upper terminal of gate 72, on account of which gate 71 produces an output pulse, when there is a zero on the left terminal and a positive pulse appears on the right terminal and gate 72 produces an output pulse, when a positive voltage is present on the lower terminal (voltage +U) and the voltage on the upper terminal goes from one to zero.

Figure 7:
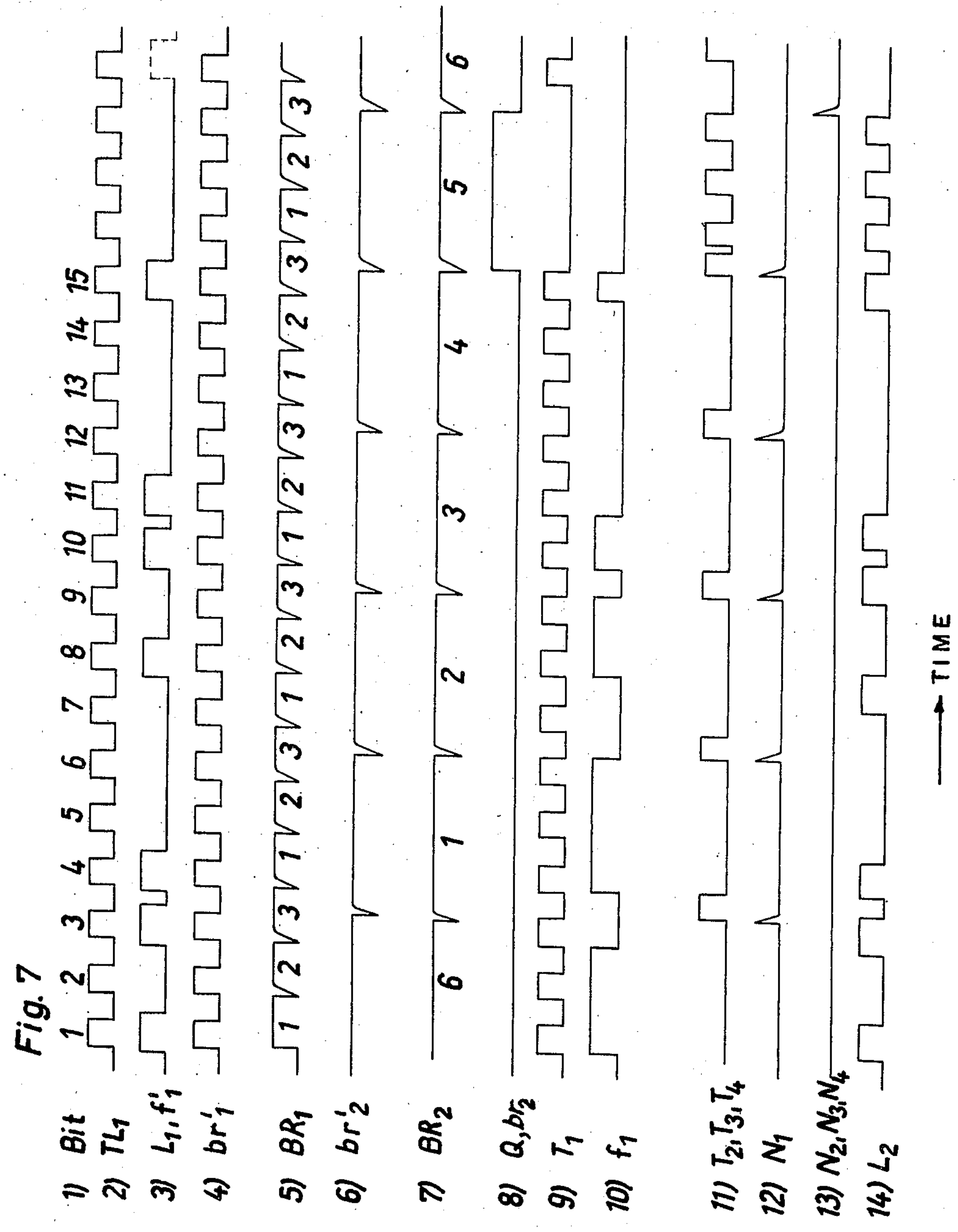
FIG. 7 is a diagram showing a series of wave forms produced at different points in the device of FIG. 5.

The operation of the device of FIG. 5 can be better understood by reference to FIG. 7, which shows a series of pulse diagrams all drawn to the same time scale. This figure shows the wave forms appearing at various points in the device for coding an information signal having the following 15 information bits:

LOL LO0 0L0 LL0 00L

The first line 1 of FIG. 7 is a series of numerals representing the position numbers of the various bits of the clock pulse train arriving via line $TL_1$ and the information pulse bits arriving via line $L_1$. The second line 2 shows the wave form produced by the series of clock pulses arriving via line $TL_1$. The third line 3 shows the wave form of the pulses representing the 15 information bits arriving via line $L_1$ in synchronism with the clock pulses and transmitted to the input $f'_1$ of flip-flop $F_1$. Line 4 shows the wave form of the clocking pulses arriving at the input terminal $br'_1$ of three-position counter $BR_1$, while line 5 shows, with the aid of suitable numerals 1, 2 and 3, the positions of counter $BR_1$ which are successively actuated by each successive pulse appearing at the inputs $br'_1$.

Line 6 shows the wave form of the signal applied to the input $br'_2$ of counter $BR_2$, while line 7 shows, with the aid of appropriate numerals, the counting position assumed by this counter for each input pulse thereto. Line 8 shows the wave form of the signal appearing on the line Q and at the output $br_2$ of counter $BR_2$. Line 9 shows the wave form of the clock pulses applied to the control input $T_1$ of flip-flop $F_1$, while line 10 shows the wave form of the signal appearing at the output $f_1$ of this flip-flop. Line 11 shows the wave form of the control pulses delivered to the control inputs $T_2$, $T_3$ and $T_4$ of flip-flops $F_2$, $F_3$ and $F_4$, respectively. Line 12 shows the wave form for erasing pulses applied to the erasing input $N_1$ of flip-flop 1, while line 13 shows the wave form for the erasing pulses applied to the erasing inputs $N_2$, $N_3$ and $N_4$. Finally, line 14 shows the wave form of the output appearing on line $L_2$, this output representing the sequential combination of the information signal delivered via line $L_1$ and the redundancy pulses produced in the coding device constitued by flip-flops $F_2$ to $F_4$.

A decoding device may be constructed on the basis of the device of FIG. 5 by making modifications similar to the modifications made in the device of FIG. 4 with respect to the device of FIG. 3. Only the logic necessary for producing a circuit capable of carrying out the operation of the switch $S_t$ of FIG. 4 must be changed.

It should be appreciated that since all of the circuits shown in the devices of FIGS. 1 through 6 which have not been described in detail are constituted by well-known digital computer arrangements, these circuits have not been described in detail in the present specification.

It wil be understood that the above description of the present invention is susceptible to various modifications, changes and adaptations, and the same are intended to be comprehended within the meaning and range of equivalents of the appended claims.

What is claimed is:

1. In a system for effectuating a linear systematic coding in order to derive, through a linear operation, K binary test bits from *i* non-redundant binary bits of an information word, means comprising:
   - (a) at least two coding devices each constituting means for receiving at least one group of binary input bits and for producing from each group of input bits, a plurality of coded output bits;
   - (b) switch means including at least one switch element connected between the coded bit output of one said coding device and the binary bit input of the next succeeding coding device for connecting said coding devices together in cascade so as to convey the coded output bits from said one coding device to the binary bit input of said next succeeding coding device; and (c) control means operatively connected to said coding devices and to said switch means for causing the coded output bits produced from each group of input bits in each coding device to be so conveyed as the input to the next succeeding coding device and for resetting, to its zero state, the coding device from which the output bits were conveyed.

2. An arrangement as defined in claim 1 wherein each transfer of output bits is carried out during the interval between successive groups of input bits to the device from which the output bits are transferred.

3. An arrangement as defined in claim 1 wherein the number of output bits produced from each group of input bits varies from one said coding device to another.

4. An arrangement as defined in claim 1 wherein each group of input bits to the first said coding device is constituted by a portion of the *i* bits of the information word.

5. An arrangement as defined in claim 1 wherein the at least one group of input bits to the first said coding device is constituted by all of the bits of the information word.

6. An arrangement as defined in claim 1 wherein each group of input bits to each but the first said coding device is constituted by the output bits produced in the immediately preceding coding device by a plurality of groups of input bits applied thereto.

7. An arrangement as defined in claim 6 wherein each said plurality of groups of input bits constitutes one entire code word applied to the respective coding device.

8. An arrangement as defined in claim 1 for decoding a received coded binary signal having *i* information bits followed by K test bits, wherein said switch means comprises: a read-in switch having one input connected to receive the coded signal, a first output connected to the input of the first of said coding devices, and a second output connected to the input of the last one of said coding devices; and switch control means connected to said read-in switch to cause the *i* information bits to be conducted to said first output and the K test bits to be conducted to said second output.

9. An arrangement as defined in claim 8 wherein said switch means further comprises conversion means for causing said system to operate selectively as a coder or a decoder.

10. An arrangement as defined in claim 1 wherein the first one of said coding devices is constituted by a first bistable flip-flop having two outputs, one information input, one control input and one reset input.

11. An arrangement as defined in claim 10 further comprising: clock pulse generating means for producing a clock pulse having the same repetition rate as the information word; and connecting means connecting the output of said clock pulse generating means to said control input of said first flip-flop for permitting a signal appearing at said information input to actuate said first flip-flop only when a clock pulse is present at said control input.

12. An arrangement as defined in claim 11 wherein said information input is connected to receive the information word.

13. An arrangement as defined in claim 12 wherein said at least two coding devices are constituted by only two devices and wherein the second of said coding devices comprises: a first modulo 2 addition stage connected to said outputs of said first flip-flop; a second bistable flip-flop having an information input connected to the output of said first addition stage, and two outputs; a second modulo 2 addition stage connected to said outputs of said second flip-flop; a third bistable flip-flop having an information input connected to the output of said second addition stage, and at least one output; and a fourth bistable flip-flop having an information input connected to said at least one output of said third flip-flop, and two outputs connected to both said addition stages.

14. An arrangement as defined in claim 13 wherein each of said flip-flops of said second coding devices includes a control input and a reset input, and wherein said control means comprises ring counter means having an input connected to said clock pulse generating means, a first output connected to said control inputs of all of said flip-flops of said second coding device, and a second output connected to both of said addition stages.

15. The arrangement as defined in claim 14 further comprising a read-out switch having a first input connected to receive the information word, a second input connected to the output of said first addition stage for receiving the K binary test bits derived from the information word, and an output for transferring each information word followed by the test bits associated therewith.

References Cited

UNITED STATES PATENTS

| | | | |
|---|---|---|---|
| 2,956,124 | 10/1960 | Hagelbarger | 178—69 |
| 3,114,130 | 12/1963 | Abramson | 340—146.1 |
| 3,162,837 | 12/1964 | Meggitt | 340—146.1 |
| 3,213,426 | 10/1965 | Melas | 340—146.1 X |
| 2,844,790 | 7/1958 | Thompson et al. | 235—92 X |
| 3,230,383 | 1/1966 | MacArthur | 235—92 X |

MAYNARD R. WILBUR, Primary Examiner

M. K. WOLENSKY, Assistant Examiner

U.S. Cl. X.R.

340—146.1